United States Patent [19]
Culling

[11] Patent Number: 5,418,578
[45] Date of Patent: May 23, 1995

[54] PRECORRECTING AN AURAL CARRIER SIGNAL IN A COMMON AMPLIFIER SYSTEM

[75] Inventor: Dennis A. Culling, Cambridge, United Kingdom

[73] Assignee: Harris Corporation, Melbourne, Fla.

[21] Appl. No.: 173,553

[22] Filed: Dec. 27, 1993

[51] Int. Cl.⁶ .............................................. H04N 5/40
[52] U.S. Cl. ................... 348/738; 348/608; 348/680
[58] Field of Search ............. 348/737, 738, 608, 680, 348/480, 482, 484; 358/197, 23, 198, 186; H04N 5/62, 5/38, 5/40

[56] References Cited

U.S. PATENT DOCUMENTS

| | | | |
|---|---|---|---|
| 4,591,915 | 5/1986 | Davidov et al. | 348/737 |
| 4,672,452 | 6/1987 | Corbel et al. | 348/608 |
| 5,198,904 | 3/1993 | Ta et al. | 358/148 |

FOREIGN PATENT DOCUMENTS

| | | | |
|---|---|---|---|
| 0392772 | 10/1990 | European Pat. Off. | H04N 5/62 |
| 5161081 | 6/1993 | Japan | H04N 5/40 |

*Primary Examiner*—James J. Groody
*Assistant Examiner*—Jeffrey S. Murrell
*Attorney, Agent, or Firm*—Tarolli, Sundheim & Covell

[57] ABSTRACT

A circuit is provided for precorrecting an aural carrier signal in a common amplifier system in a television transmitter wherein an aural frequency signal and a visual signal are commonly amplified. The precorrecting serves to minimize cross-modulation distortion of the aural carrier caused by the common amplification. A visual carrier signal is modulated by a video baseband signal to provide a modulated video signal from which there is provided a sampled video signal. This sampled video signal is supplied to an aural corrector which provides from the sampled video signal a phase correction signal and an amplitude correction signal. The phase correction signal and amplitude correction signal are used to modulate an aural carrier signal to provide a precorrected aural signal which is then combined with the video signal to provide a combined signal.

12 Claims, 5 Drawing Sheets

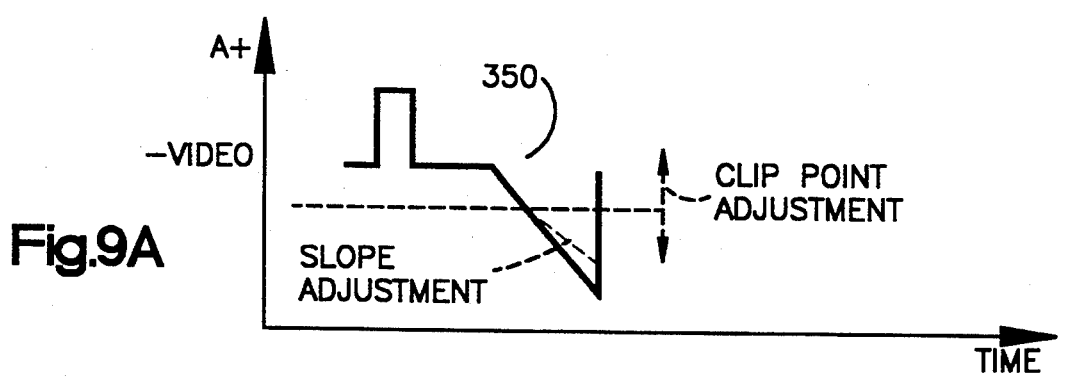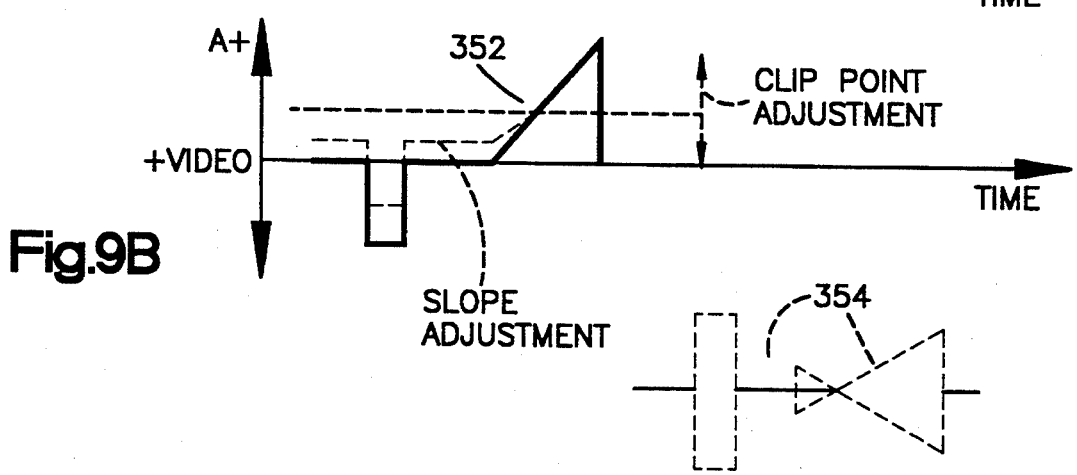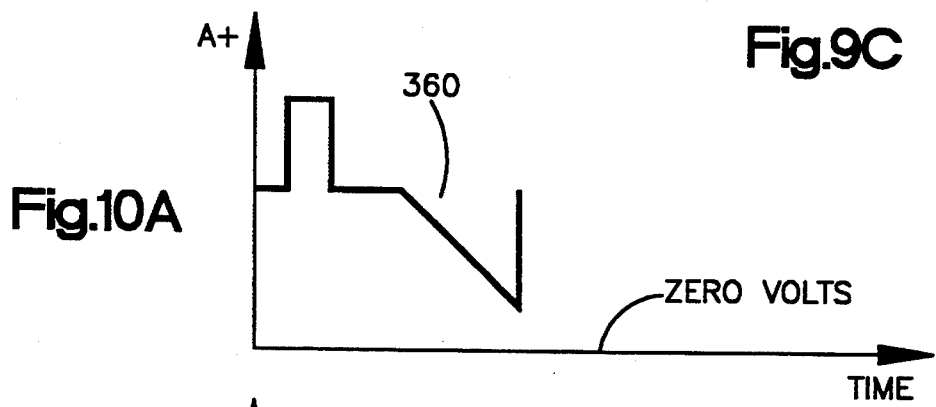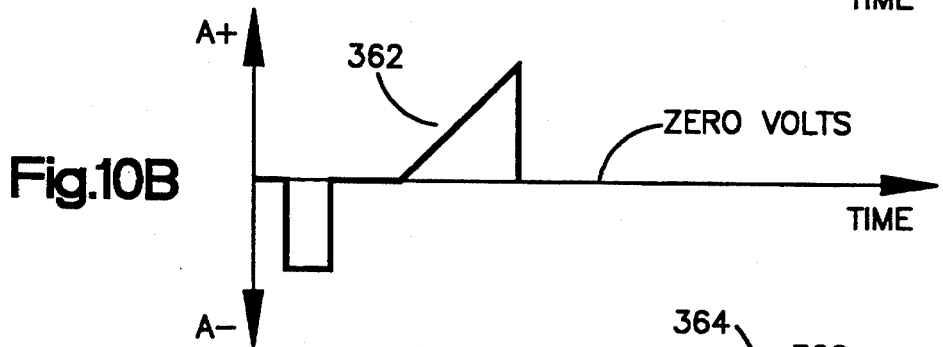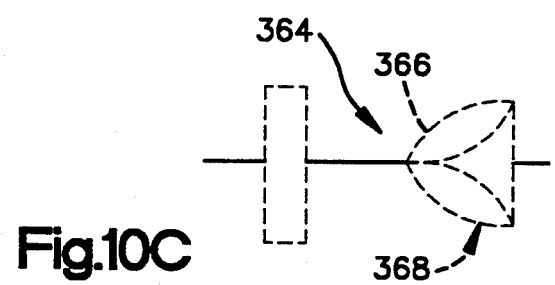

5,418,578

PRECORRECTING AN AURAL CARRIER SIGNAL IN A COMMON AMPLIFIER SYSTEM

FIELD OF THE INVENTION

This invention relates to the art of common amplification television transmitters wherein aural and visual signals are commonly amplified.

BACKGROUND OF THE INVENTION

It is known to provide common amplification in television transmitters wherein the visual and aural carriers are commonly amplified. The United States patent to Ta et al. 5,198,904 noted that a problem resulting from such common amplification is aural carrier distortion. The distortion occurs in both the phase and amplitude domains of the aural carrier.

The patent to Ta proposes to correct the unwanted distortion of the aural carrier by predistorting phase and amplitude components of the aural carrier so as to be directly opposite to the unwanted distortions caused by the common amplification in a television transmitter. To this end, Ta samples the baseband video signal prior to the signal being used to modulate a visual IF carrier signal. The sampled baseband video signal is delayed by a video delay to compensate for the delays that are introduced in an IF vision modulator to which the baseband video signal is also supplied for modulating a visual carrier signal. The delayed baseband video signal is then applied to a complementary nonlinear amplifier which provides a phase correction signal and an amplitude correction signal. These correction signals are supplied to an amplitude and phase modulator which also receives the aural carrier. The aural carrier is modulated by the amplitude and phase correction signals to provide a modified aural signal which is summed with the output of the IF vision modulator.

It has been found that the sampled baseband video signal in the Ta et al. patent has a relatively flat amplitude response over the baseband video spectrum. However, the cross-modulation on the aural carrier has two different sideband levels. The high level is created by the double sideband region of the visual spectrum, that is ±0.75 MHz about the visual carrier frequency. The half amplitude levels extending to ±4.2 MHz about the aural carrier are due to the single sideband region (0.75−4.2 MHz) of the visual spectrum. Therefore, when modulating the aural carrier with frequency and amplitude correction signals based on Ta's flat spectral response (of the baseband signal) an incomplete cancellation of the cross-modulation will result. That is, if the ±0.75 MHz region is eliminated, then the single sideband regions will be over corrected. The over-correction can result in line rate sidebands being created about the aural carrier which falls back into the visual passband. Because the phase of these sidebands is not controlled, they add and subtract from the wanted visual line rate sidebands causing a change to the visual spectrum. The net result is that black to white transitions and sync pulse edges have a fuzzy appearance.

Another problem noted in the Ta et al. patent is the cost and complexity of a video delay circuit which serves to delay the baseband video signal prior to developing the correction signals. This video delay serves to compensate for the delays introduced in the IF vision modulator and filter where the baseband video signal modulates the visual IF carrier signal. Such delay circuits are expensive and, consequently, it is desirable to design circuitry to minimize or eliminate the use of such circuits.

SUMMARY OF THE INVENTION

It is an object of the present invention to provide an improved aural correction system wherein a video signal is obtained for use in developing amplitude and phase correction signals with the video signal being obtained from a location after the IF vision modulator so as to eliminate the need for a video delay circuit as required in the Ta et al. patent discussed above.

It is a still further object of the present invention to provide an aural correction circuit wherein the video signal employed for providing phase and amplitude correction signals is obtained from a point subsequent to the IF vision modulator so that the sampled video signal includes visual carrier characteristics and exhibits a first high level amplitude at frequencies in the double sideband region of the frequency spectrum and a second lower level amplitude at frequencies extending therefrom into the single sideband regions of the frequency spectrum. This is done to provide correction which is opposite to the cross-modulation over the full spectrum thereof to thereby achieve full cancellation of the cross-modulation on the aural carrier.

In accordance with the present invention, apparatus is provided for precorrecting an aural frequency carrier in a common amplifier system wherein an aural frequency signal and a visual frequency signal are commonly amplified and wherein the precorrecting serves to minimize cross-modulation distortion of the aural carrier caused by the common amplification. The precorrecting apparatus includes means for receiving a modulated visual signal and which is comprised of a visual carrier signal modulated by a video baseband signal, and providing therefrom a sampled video signal. The sampled video signal is received by an aural corrector which provides therefrom a phase correction signal and an amplitude correction signal. These signals are supplied to phase and amplitude modulation circuitry for modulating an aural carrier with the phase and amplitude correction signals to provide a precorrected aural signal which is opposite the cross-modulation distortion. The video signal and the precorrected aural signal are combined and commonly amplified in a manner to cancel the cross-modulation.

BRIEF DESCRIPTION OF THE DRAWINGS

The foregoing and other objects and advantages of the invention will become more readily apparent from the following description as taken in conjunction with the accompanying drawings, wherein:

FIG. 9 which is comprised of FIGS. 9A, 9B and 9C shows waveforms of amplitude with respect to time; and FIG. 10 which is comprised of FIGS. 10A, 10B and 10C shows waveforms of amplitude with respect to time.

DESCRIPTION OF PREFERRED EMBODIMENT

Figure 1:
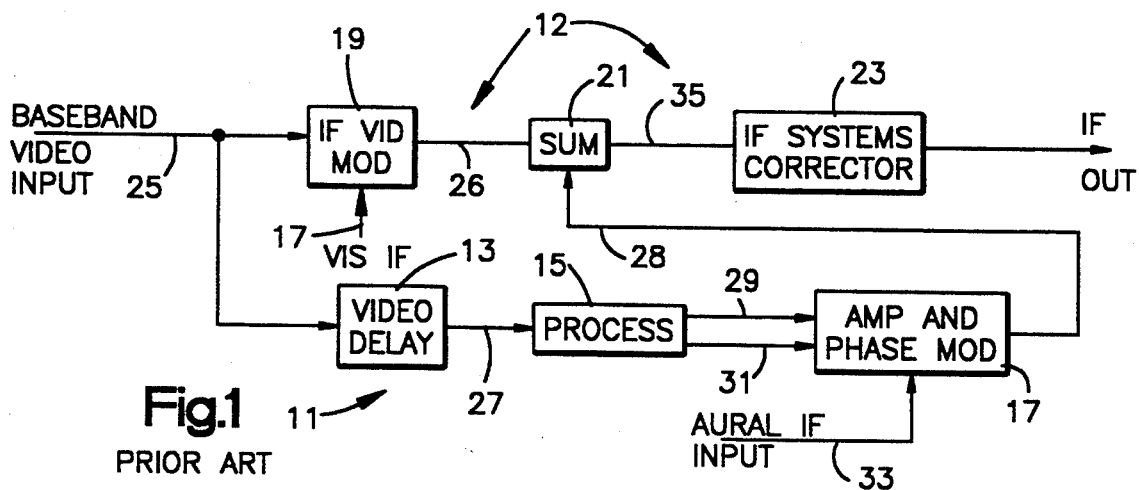
FIG. 1 is a schematic-block diagram illustration of a prior art aural corrector to be described herein.

Before describing the preferred embodiment of the invention herein, reference is first made to FIG. 1 which illustrates a prior art aural carrier correction circuit based on that shown in the U.S. Patent to Ta et al. 5,198,904, the description of which is incorporated herein by reference. The character references shown in FIG. 1 herein correspond to those employed in FIG. 1 of the Ta et al. patent.

As shown in FIG. 1, there is provided an aural carrier correction system 11 in conjunction with a television transmitter, partly shown at 12. The transmitter includes an IF vision modulator 19 followed by a summing circuit 21 and an IF system corrector 23. The system 11 includes a video delay 13, a processor 15 and an amplitude and phase modulator 17. The IF vision modulator receives a baseband video input signal 25 which is used to modulate a visual IF carrier signal 17 to provide an IF visual signal 26. The IF visual signal 26 is summed with a modified IF aural signal 28 at the summing circuit 21 and the combined signal 35 is then supplied to an IF system corrector 23. The baseband video signal 25 is also used as a sample point to supply a sampled baseband video signal to the aural corrector system 11. System 11 includes a complementary amplifier which uses the sampled baseband video signal to provide an amplitude correction signal 29 and a phase correction signal 31. These signals modulate the aural carrier in the modulator circuit 17 which supplies a modified IF aural signal 28 to the summer 21. Since the baseband video signal 25 is delayed by the IF vision modulator 19, a similar delay is provided by the video delay circuit 13 in the aural corrector system 11 so that there is a coincidence between the modified IF aural signal 28 and the visual signal 26 outputted by the IF vision modulator 19. These two signals 26 and 28 are summed by the summer 21 and supplied to the IF system corrector circuit 23.

Figure 2:
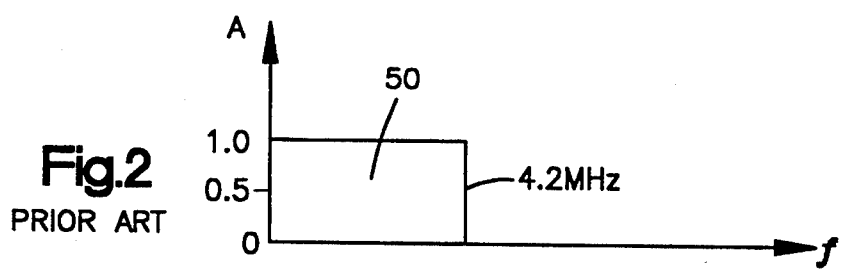
FIG. 2 is a spectrum of amplitude with respect to frequency showing the flat baseband sampled video signal employed by the corrector circuitry of the prior art in FIG. 1.
Figure 3A:
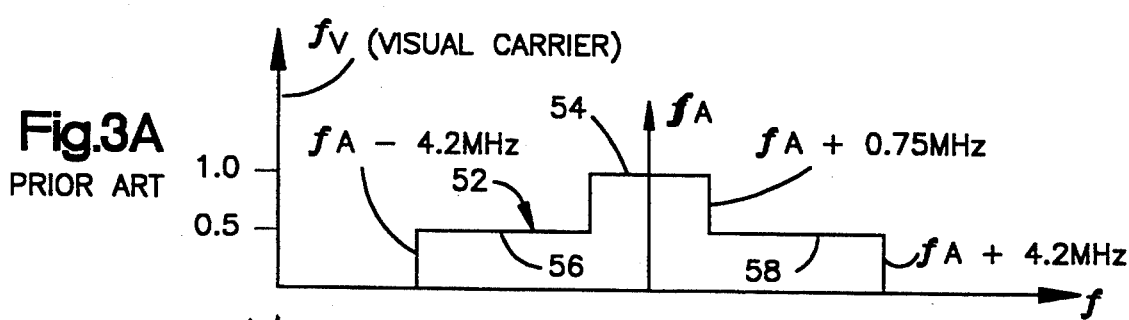
FIG. 3 which is comprised of FIGS. 3A, 3B and 3C, are spectra of amplitude with respect to frequency showing the manner of operation of the prior art circuit of FIG. 3.
Figure 3B:
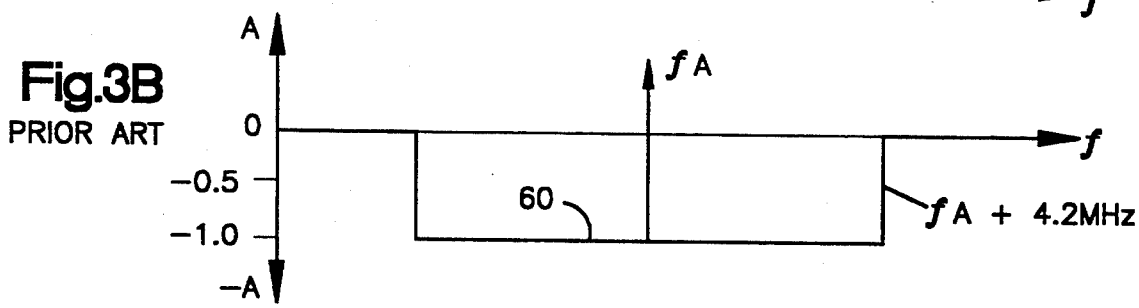
Figure 3C:
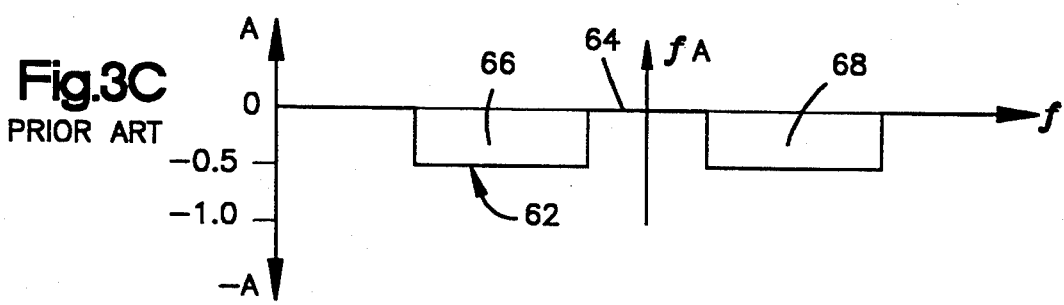

Reference is now made to FIG. 2 which illustrates curve 50 which represents the sampled baseband video signal and which has a relatively flat level over the baseband spectrum being illustrated. Reference is now made to FIG. 3A which illustrates a curve 52 of the cross-modulation on the aural carrier $F_A$ over the frequency spectrum from $F_A - 4.2$ MHz to $F_A + 4.2$ MHz. This includes a central or double amplitude region 54 due to the double sideband region of the visual signal immediately surrounding the carrier frequency $F_A$ and lower amplitude regions 56 and 58. It is this cross-modulation 52 over the entire cross-modulation spectrum that is desired to be cancelled by the aural corrector 11. However, the aural corrector 11 of the Ta et al. patent provides its correction signal based on the flat spectral response curve 50 shown in FIG. 2. When the aural carrier signal $F_A$ is modulated with the baseband signal 25 (curve 50) the result is a correction signal corresponding with curve 60 shown in FIG. 3B. Note that this is a flat response over the frequency spectrum of the cross-modulation of FIG. 3A and that the negative sign indicates antiphase. Combining the two curves 52 and 60 results in curve 62, as shown in FIG. 3C. This curve 62 shows that whereas cancellation of the cross-modulation takes place in the double sideband region 64, an over correction takes place in the single sideband regions 66 and 68. This over correction based on the circuit in the Ta et al. patent can, when large amplitudes of correction are required, introduce fuzzy edges on the visual black/white transitions due to the presence of unwanted incorrectly phased sidebands.

The present invention is directed toward improvements over that disclosed in the Ta et al. patent so as to avoid the over correction noted with respect to the single sideband portions 66 and 68 of curve 62 in FIG. 3C and also to eliminate the need for employing a video delay such as delay 13 in the Ta et al. patent.

Figure 4:
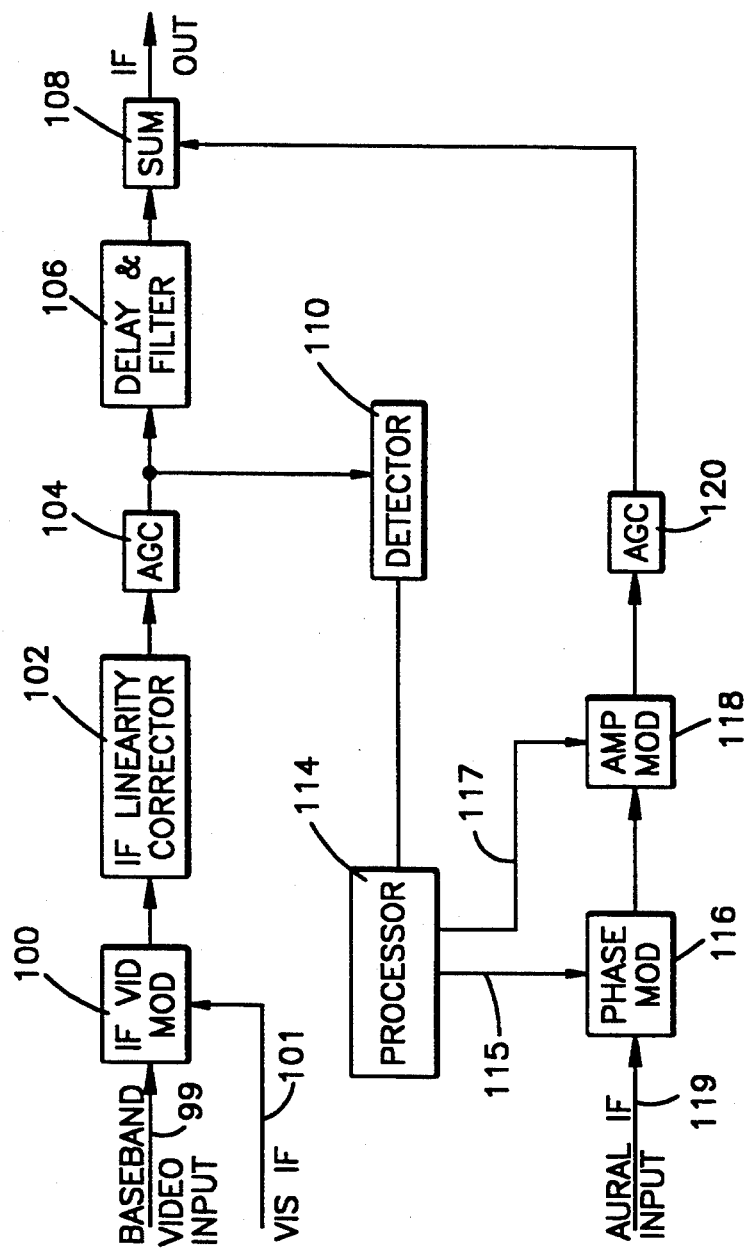
FIG. 4 is a schematic-block diagram illustration of an embodiment of the invention herein.

Reference is now made to FIG. 4 which illustrates one embodiment of the invention herein. In this embodiment it is contemplated that a baseband video input signal 99 is supplied to an IF vision modulator 100 which also receives a visual IF carrier signal 101. The modulated visual signal is then precorrected for distortions introduced in the power amplifier in a conventional IF linearity corrector circuit 102 (having adjustment means, not shown) with the corrected visual signal being supplied to an automatic gain control circuit 104. The automatic gain control (AGC) circuit 104 provides a constant amplitude video signal used in the aural signal correction circuit to be described below. The video signal obtained from the automatic gain control circuit (AGA) 104 is supplied to a filter and delay circuit 106, the purpose of which is to equalize the video processing time in processor 114, the output of which is supplied to a summing circuit 108. The video signal from the automatic gain control circuit 104 is demodulated or detected by a detector 110 with the detected video signal then being supplied to a processor 114 which provides both a phase correction signal 115 and an amplitude correction signal 117. These signals will be discussed in greater detail hereinafter.

The aural IF carrier input signal 119 is applied to a phase modulator 116 and then to an amplitude modulator 118 where the aural carrier is modulated by the phase correction signal 115 and the amplitude correction signal 117 with the output being supplied to an automatic gain control (AGC) 120. The precorrected or modified carrier signal is then supplied to the summing circuit 108 with the output thereof, as in the case of the circuit of FIG. 1, being commonly amplified and transmitted.

It is noted that the video signal employed by the video processor 114 is sampled by detector 110 which is downstream from the vision modulator 100 and from the IF linearity corrector 102. Consequently, the sampled video signal in FIG. 4 is taken from an entirely different sample point in the frequency spectrum from that of the sample obtained from the baseband video input signal 25 in the prior art of FIG. 1. Also, the linearity corrector 102 in FIG. 4 is upstream from the summer 108 and, consequently, visual correction is made independently of aural correction. In FIG. 1, the visual correction is made in corrector 23 after the visual carrier has been summed with the modified aural carrier.

Figure 5:
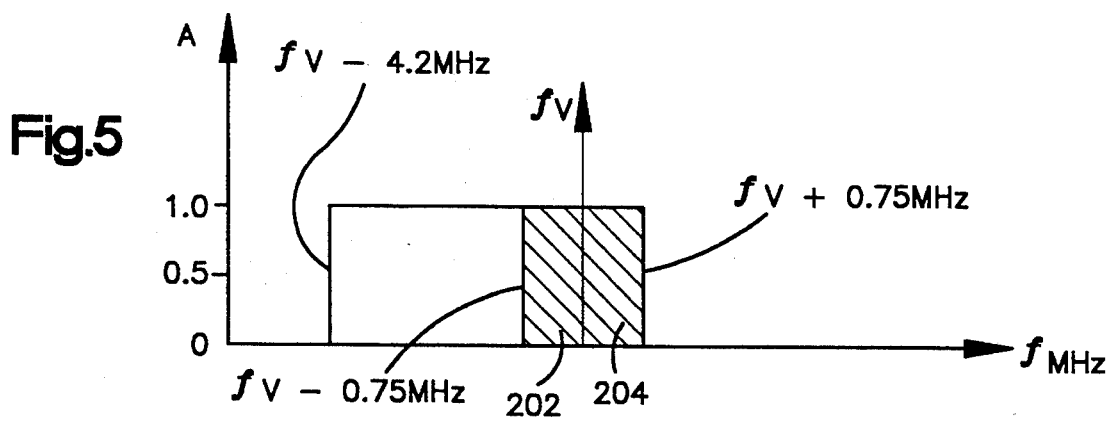
FIG. 5 is a waveform of amplitude with respect to frequency.

Reference is now made to FIG. 5 which illustrates a curve 200 showing amplitude with respect to frequency of a signal taken from the output of the IF vision modulator 100 in FIG. 4. This signal represents the vestigial sideband filtered modulated visual IF spectrum. This signal shows lower and upper double sideband regions 202 and 204 on either side of the visual carrier frequency $F_v$. After detection by the detector circuit 110, the sampled video signal appears as curve 210 in FIG. 6 having a higher magnitude portion 208 at the double sideband portion and a lower magnitude portion 212 extending from 0.75 Mhz out to approximately 4.2 MHz. This sampled video signal differs substantially from that of the sampled video signal represented by curve 50 in FIG. 2.

Figure 7A:
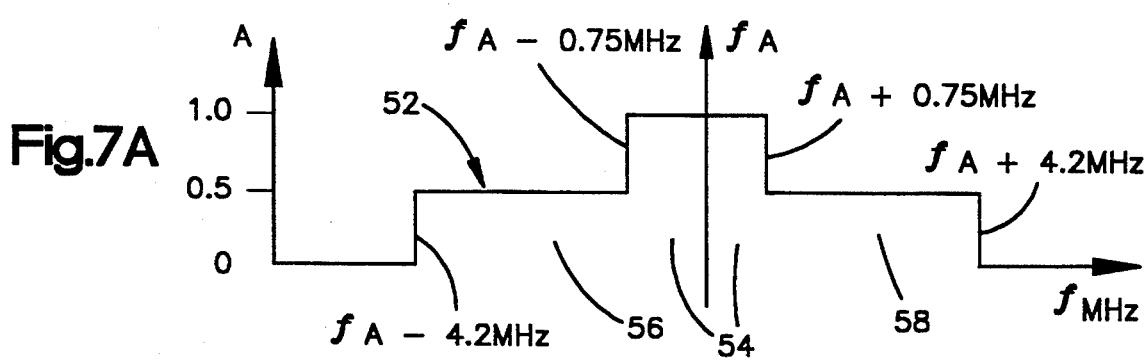
FIG. 7 which is comprised of FIGS. 7A and 7B shows waveforms of amplitude with respect to frequency.
Figure 7B:
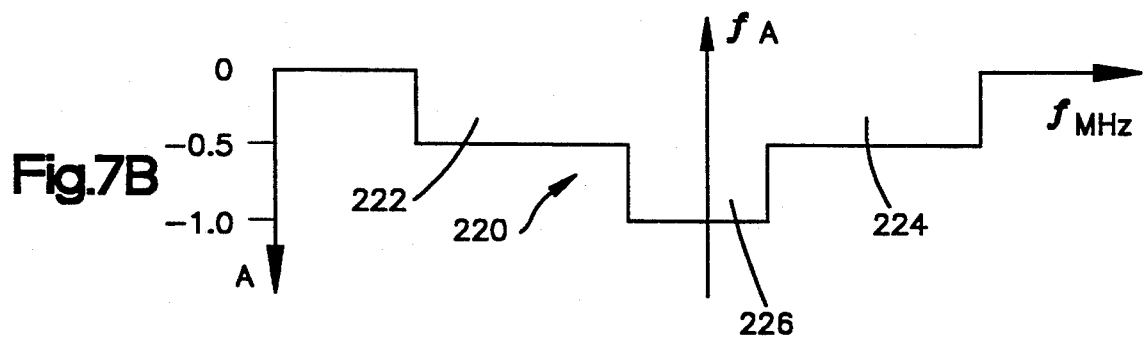

Reference is now made to FIG. 7 which includes FIGS. 7A and 7B. FIG. 7A is a repeat of FIG. 3A which illustrates the cross-modulation 52 on the aural carrier $F_A$ including that due to the visual single sideband portions at 56 and 58 and that due to the visual double sideband portion at 54. It is this cross-modulation that should be cancelled by the correcting signals.

Figure 6:
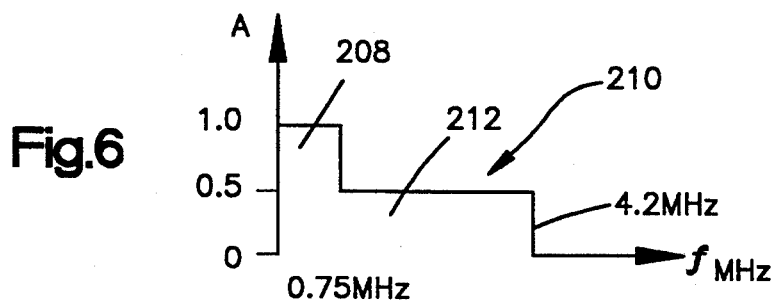
FIG. 6 is a waveform of amplitude with respect to frequency showing the sampled video signal in accordance with the invention herein.

In accordance with the present invention, the sampled video signal spectrum illustrated by the curve 210 in FIG. 6 is employed by the corrector circuits herein for modulating the aural IF carrier signal 119 so as to obtain a modulated carrier appearing as curve 220 in FIG. 7B. Curve 220 includes half amplitude portions 222 and 224 and a full sideband portion 226, the negative sign indicating that the spectrum is in antiphase. It is seen that when the cross-modulation curve 52 is combined with the correction curve 220, complete cancellation results in accordance with the present invention. The circuitry of FIG. 4 to accomplish the foregoing will now be described in greater detail with the expanded circuitry illustrated in FIG. 8.

Figure 8:
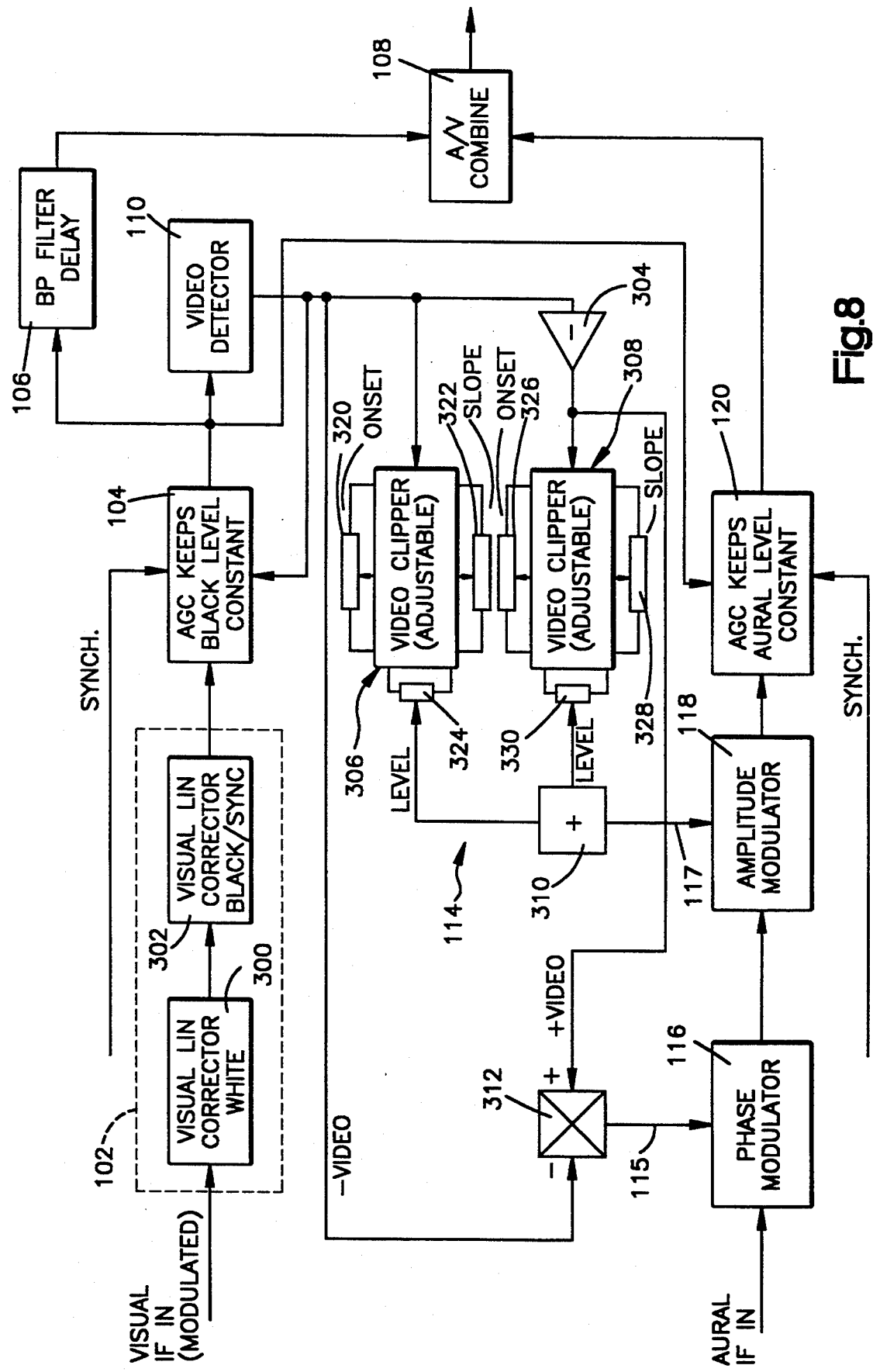
FIG. 8 is a more detailed schematic-block diagram of one embodiment of the invention.

Reference is now made to FIG. 8 which is an expanded version of the circuitry illustrated in FIG. 4 and wherein like components are identified with like character references to facilitate the description herein. In FIG. 8, the visual corrector circuit 102 corresponds with the IF linearity corrector circuit 102 in FIG. 4 and serves to receive the output of the IF vision modulator 100. That signal is a visual IF input signal which includes the visual carrier signal modulated by the baseband video signal 99. The visual corrector circuit 102 includes conventional corrector circuits 300 and 302 which are adjustable and serve to provide correction signals for the white level and the black-sync levels. The output of the visual corrector circuit 102 is supplied to an automatic gain control 104 that serves to keep the black level of the detected video signal constant. This is the video signal that is used for the aural correction and it is desirable that the amplitude be maintained constant. It is known that the amplitude of the video signal, but for the automatic gain control circuit, varies in value with time, temperature and input level and adjustment of the correctors 300 and 302. The modulated visual IF signal supplied to corrector 102 is predistorted by the visual correctors 300 and 302 in a way which will aid in the correction of the aural carrier. This predistortion is created by the visual correctors 300 and 302 in the process of "mopping up" residual video distortion present on the visual output of the host transmitter. The automatic gain control circuit 104 keeps the modulated visual IF level constant. The output of the automatic gain control 104 is detected by the video detector 110. This may be referred to as the sampled video signal and with some changes made thereto is used for driving the phase modulator 116 and the amplitude modulator 118, as will be described in greater detail hereinafter. The sampling for the gain control circuit is obtained during the video horizontal blanking period at the output of the video detector 110.

As discussed previously with respect to FIG. 4, the sampled video signal may take the form of spectrum 210 in FIG. 6 including a first high level portion 208 and a lower level portion 212 as opposed to the relatively flat spectral response as shown by curve 50 in FIG. 2 and which is representative of the sampled video signal employed in the Ta et al. patent discussed hereinbefore. The sampled video signal in FIGS. 4 and 8 is taken from a point after the visual IF carrier signal 101 has been modulated by the baseband video input signal 99 so as to provide an output signal which generally takes the form of curve 200 shown in FIG. 5. Curve 200 represents the vestigial sideband filtered, modulated visual IF spectrum which, when detected by the video detector 110, provides a signal with a spectrum as shown by waveform 210 in FIG. 6. The higher level portion 208 in FIG. 6 from 0 to 0.75 MHz is due to the fact that for a baseband modulating frequency up to 0.75 MHz, a double sideband output exists due to the shape of the IF filter used in the IF vision modulator 19 of FIG. 1 or in the IF vision modulator 100 in FIG. 4.

The sampled video signal obtained from the video detector 110 is negative in that the synchronization pulses are positive going and the picture information is negative going. This is considered a negative video signal and is inverted by an inverter amplifier 304 inside the video processor 114 (see FIG. 8). This video processor 114 as shown in FIG. 8 also includes a negative video signal clipper circuit 306, a positive video clipper circuit 308, and a summing circuit 310 for summing the outputs of the clipper circuits 306 and 308 and supplying the amplitude correction signal 117 to the amplitude modulator 118. The video processor also includes an analog multiplier 312 which multiplies the negative video signal obtained from the video detector 110 and the positive video signal obtained from inverter amplifier 304 to provide the phase correction signal 115 that is supplied to the phase modulator 116.

The video clipper circuits 306 and 308 are conventional in the art and each includes an onset adjuster, a slope adjuster and an amplitude level adjuster. The adjustable clipper circuit 306 includes an onset adjuster taking the form of potentiometer 320, a slope adjuster taking the form of a potentiometer 322 and a level adjuster taking the form of a potentiometer 324. Likewise, the positive video signal clipper 308 includes an onset adjuster taking the form of a potentiometer 326, a slope adjuster taking the form of a potentiometer 328, and a level adjuster taking the form of a potentiometer 330. The sampled or detected video signals provided by the video detector 110 are distorted or precorrected by the clipper circuits 306 and 308 where the onset or clip points and the slopes are adjustable using the onset and slope adjusters.

The detected positive and negative video signals are distorted by the clipper circuits 306 and 308 where the clip points or onset points as well as the slopes are adjustable. The outputs of the clipper circuits 306 and 308 are also adjustable in level by the level potentiometers 324 and 330 prior to being summed in the summation circuit 310. The summation circuit 310 produces the correcting or modulating signal 117 which is supplied to the amplitude modulator 118 to predistort or precorrect the aural carrier signal. This signal appears as waveform 354 in FIG. 9C. It is to be noted particularly from FIG. 9C that the correcting or modulating signal may have a zero, positive or negative picture signal as well as a zero, positive or negative going sync pulse as required by the transmitter being corrected.

The negative and positive video signals are also illustrated in FIGS. 10A and 10B as curves 360 and 362. These signals are supplied to the analog multiplier 312 (FIG. 8) to provide an output signal 115 which is supplied to the phase modulator 116. The effect of multiplying the positive and negative video signals is indicated by the curve 364 in FIG. 10C. This curve 364 shows curved positive and negative portions 366 and 368 which are the result of the multiplying of the two signals in the multiplier 312. This predistorted or precorrected modulating signal 115 is supplied to the phase modulator 116 for precorrecting the aural carrier signal. The phase modulator 116 provides very little amplitude modulation and the amplitude modulator 118 is of a doubly balanced type.

The output of the amplitude modulator 118 is supplied to an aural automatic gain control circuit (AGC) 120. The AGC circuit 120 serves to ensure that the aural power is held constant during the adjusting procedure. The carrier level at a time corresponding to the visual back porch of the video signal is used as the reference.

A bandpass filter 106 is incorporated in the visual signal IF path just prior to the aural-video combiner 108. This filter provides a delay which compensates the processing time in the detector and video circuits thereby ensuring that the aural correction is correctly timed relative to the visual modulation and the sidebands are in correctly phased for cancellation.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for precorrecting an aural carrier signal in a common amplifier system wherein the precorrecting serves to minimize cross-modulation distortion of said aural carrier signal caused by said common amplifier system and comprising:

means for receiving a modulated visual signal comprised of a visual carrier signal modulated by a video baseband signal and providing therefrom a sampled video signal;

aural corrector means for receiving said sampled video signal and providing therefrom a phase correction signal and an amplitude correction signal;

phase and amplitude modulating means for receiving said aural carrier signal and modulating same with said phase and amplitude correction signals to provide a precorrected aural signal; and means for combining said visual signal with said precorrected aural signal to provide a combined signal.

2. Apparatus as set forth in claim 1 wherein said receiving means includes detecting means for detecting said modulated visual signal and providing said sampled video signal.

3. Apparatus as set forth in claim 2 including visual corrector means for correcting said modulated visual signal prior to application thereof to said detecting means.

4. Apparatus as set forth in claim 3 wherein said visual corrector means includes white level corrector means and black level corrector means.

5. Apparatus as set forth in claim 3 including automatic gain control means for maintaining a constant black level and located intermediate said visual corrector means and said detecting means.

6. Apparatus as set forth in claim 2 wherein said detecting means provides a negative video signal and inverter means responsive thereto for providing a positive video signal.

7. Apparatus as set forth in claim 6 wherein said aural corrector means includes positive video signal clipper adjuster means and negaative clipper adjuster means for respectively adjusting said positive video signal and said negative video signal.

8. Apparatus as set forth in claim 6 wherein said aural corrector means includes multiplying means for multiplying said positive and negative video signals together with the product thereof serving as said phase correction signal.

9. Apparatus as set forth in claim 1 wherein said aural corrector means includes video clipper means for providing said amplitude correction signal.

10. Apparatus as set forth in claim 9 wherein said video clipper means includes onset adjuster means.

11. Apparatus as set forth in claim 9 wherein said video clipper means includes slope adjuster means.

12. Apparatus as set forth in claim 11 including onset adjuster means and level adjuster means.

* * * * *